No. 659,828. Patented Oct. 16, 1900.
E. W. RICE, Jr.
SYSTEM OF ELECTRICAL DISTRIBUTION.
(Application filed Aug. 16, 1899.)
(No Model.)
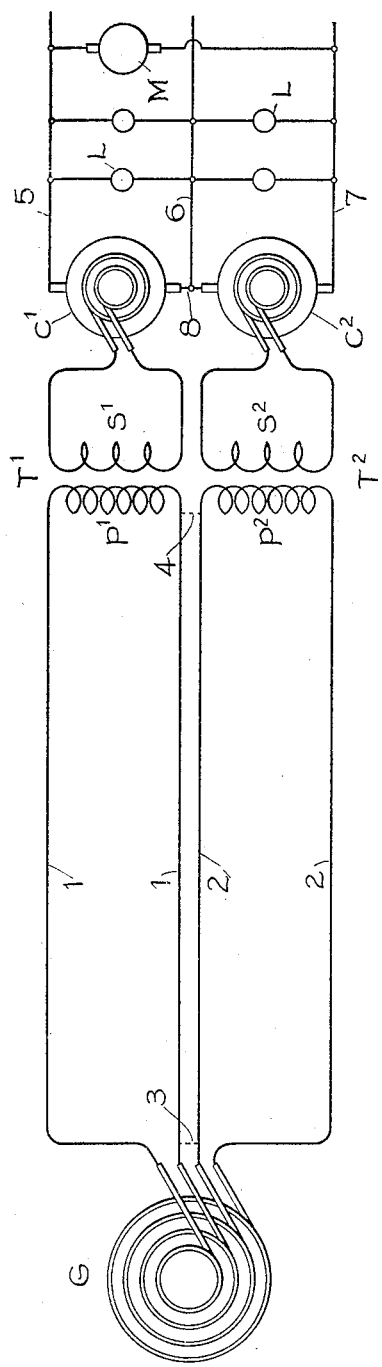
WITNESSES:
A. H. Abell.
A. F. Macdonald.
INVENTOR.
Edwin W. Rice, Jr.,
by Albert G. Davis
Atty.

UNITED STATES PATENT OFFICE.

EDWIN W. RICE, JR., OF SCHENECTADY, NEW YORK, ASSIGNOR TO THE GENERAL ELECTRIC COMPANY, OF NEW YORK.

SYSTEM OF ELECTRICAL DISTRIBUTION.

SPECIFICATION forming part of Letters Patent No. 659,828, dated October 16, 1900.

Application filed August 16, 1899. Serial No. 727,348. (No model.)

*To all whom it may concern:*

Be it known that I, EDWIN W. RICE, Jr., a citizen of the United States, residing at Schenectady, county of Schenectady, State of New York, have invented certain new and useful Improvements in Systems of Electrical Distribution, (Case No. 1,038,) of which the following is a specification.

My present invention relates to means for transforming multiphase alternating current into direct current in such manner and by the employment of such apparatus as will permit the direct current produced to be utilized for feeding three-wire or other multiple-conductor direct-current systems.

My invention will be better understood by reference to the following description, taken in connection with the accompanying drawing, while its scope will be particularly pointed out in the appended claims.

In the drawing, G is intended to indicate any suitable source of multiphase current, and in this instance four collector-rings are shown as representing a source of two-phase current. The transmission-lines connected thereto consist in the present instance of two independent circuits formed of conductors 1 1 and conductors 2 2. The conductors 1 1 serve to convey an alternating current of one phase, while the conductors 2 2 carry alternating current of another phase, the currents being angularly displaced from each other by approximately ninety degrees. In practice I find it preferable to maintain the two circuits carrying current of different phase independent of each other; but this is not requisite, since, if desired, two of the conductors may be consolidated, so as to form a single return-conductor in a manner well understood in the art. The dotted lines 3 4 indicate this alternative construction and are shown as connecting together two of the conductors 1 2.

Transformers $T'$ $T^2$ are used for securing suitable impressed electromotive forces for the rotary converters $C'$ $C^2$. These transformers are shown as of the single-phase type, the primary $P'$ of one transformer being supplied from the lines 1 1, while the primary $P^2$ of the other transformer is supplied from the lines 2 2. The secondaries $S'$ $S^2$ of the transformers are independent of each other and are individually connected to the single-phase rotary converters $C'$ $C^2$, the direct-current terminals of which are arranged in series and connected to a three-wire direct-current system. The converter $C'$ is fed from the secondary $S'$, while its companion converter is fed from the secondary $S^2$.

The conductor 6, which forms the neutral of the direct-current three-wire system, is connected to the common connection 8 between the direct-current terminals of the converters, while the outside conductors 5 7 of the three-wire system are connected to the remaining direct-current terminals of the converters. Suitable translating devices, such as lamps L or a motor M, are fed from the mains of the three-wire system, as shown. With this arrangement all the advantages of the three-wire system of distribution are obtained in connection with a transmission-line in which the power is conveyed through the medium of alternating currents.

Although I have shown the transformers $T'$ $T^2$ as of the single-phase type, it will be evident that other means for transformation may be employed—such, for example, as a two-phase transformer with a common return magnetic circuit—or, if desired, the transformers may be entirely omitted and the converters fed directly from the transmission-line.

What I claim as new, and desire to secure by Letters Patent of the United States, is—

1. The combination of a multiphase source of supply, single-phase rotary converters fed from different phases of said source, and direct-current mains fed by said rotary converters.

2. The combination of a multiphase source of supply, single-phase rotary converters differently connected to said source, and a multiple conductor, direct-current system fed by said rotary converters.

3. The combination of a multiphase source of supply, single-phase rotary converters fed one from one phase and another from another phase of said source, and a multiple-conductor direct-current system fed by said rotary converters.

4. The combination with a source of multiphase current, single-phase rotary converters fed one from one phase and another from another phase of said source, and a direct-current system fed jointly by said rotary converters.

5. The combination with the conductors of a multiphase system, of a plurality of secondary coils supplied with energy transmitted over said conductors, and a plurality of rotary converters one of which is supplied with energy solely from one of said secondary coils.

6. The combination with a multiphase system, of a plurality of independent secondary coils supplied with energy from said system, and a plurality of rotary converters each fed solely from one of said secondary coils.

7. The combination of a quarter-phase system of distribution and rotary converters fed one from one of the sides of said system and another from another side of said system.

8. The combination of a quarter-phase system of distribution, rotary converters fed one from one side of said system and another from another side of said system and a multiple-wire direct-current system fed by said converters.

9. The combination of a multiphase system of distribution, rotary converters each fed from one of the sides of said system, and a multiple-wire direct-current system fed by said converters.

10. The combination of a multiphase system, and means for separately transforming into direct current the current derived from each side of said system.

11. The combination of a plurality of rotary converters, a multiphase distribution system, and means for supplying one rotary converter with current derived from said system and of a phase different from that supplied to another rotary converter.

In witness whereof I have hereunto set my hand this 14th day of August, 1899.

EDWIN W. RICE, JR.

Witnesses:
BENJAMIN B. HULL,
MABEL E. JACOBSON.